United States Patent [19]

Kanengieter

[11] 3,792,870

[45] Feb. 19, 1974

[54] CENTER AXLE SUSPENSION SYSTEM FOR TRAILERS

[75] Inventor: Glenn G. Kanengieter, Blooming Prairie, Minn.

[73] Assignee: Owatonna Manufacturing Co., Inc., Owatonna, Minn.

[22] Filed: Aug. 31, 1972

[21] Appl. No.: 285,532

[52] U.S. Cl. .............................. 280/81 R, 267/20
[51] Int. Cl. .............................. B60p 1/04
[58] Field of Search .... 280/80 R, 81 R, 81 A, 81 B; 267/20

[56] References Cited
UNITED STATES PATENTS
2,957,708 10/1960 Hersey et al. ............... 267/20 R X
3,044,795 7/1962 Standing et al. .................. 280/81 A FOREIGN PATENTS OR APPLICATIONS
1,480,053 11/1969 Germany .......................... 280/81 B Primary Examiner—M. Henson Wood, Jr.
Assistant Examiner—Michael Y. Mar
Attorney, Agent, or Firm—Schroeder Siegfried Ryan and Vidas

[57] ABSTRACT

A center axle suspension system for trailers in which the trailer chassis has conventional side wheels for supporting the same and a pair of center wheels positioned ahead of the side wheels and mounted on a pivoted lever to permit pivotal upward and downward movement of the center wheels relative to the fixed side wheels for increased stability and smoother ride of the trailer.

6 Claims, 4 Drawing Figures

PATENTED FEB 19 1974 3,792,870
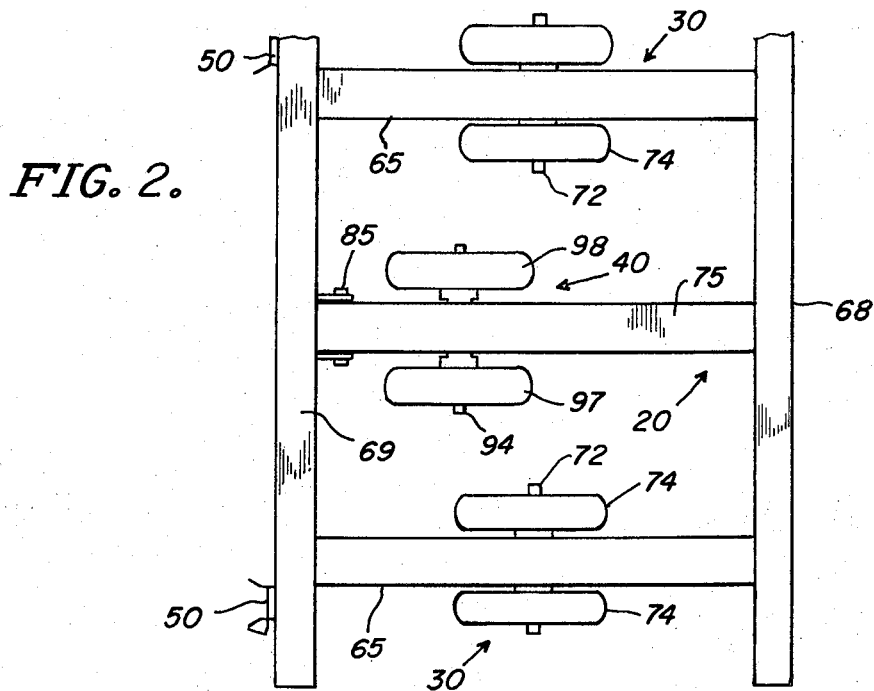
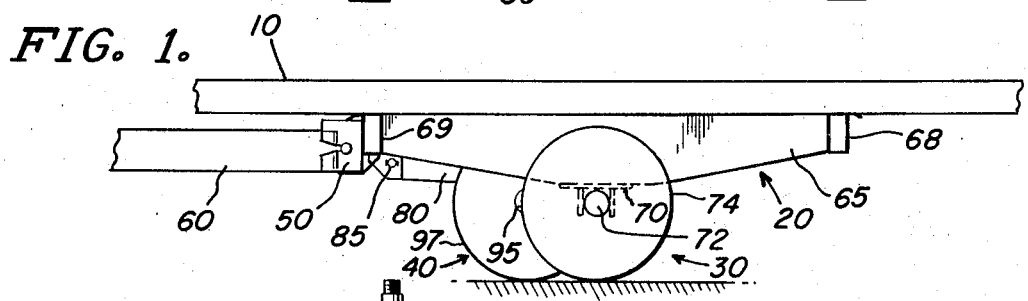
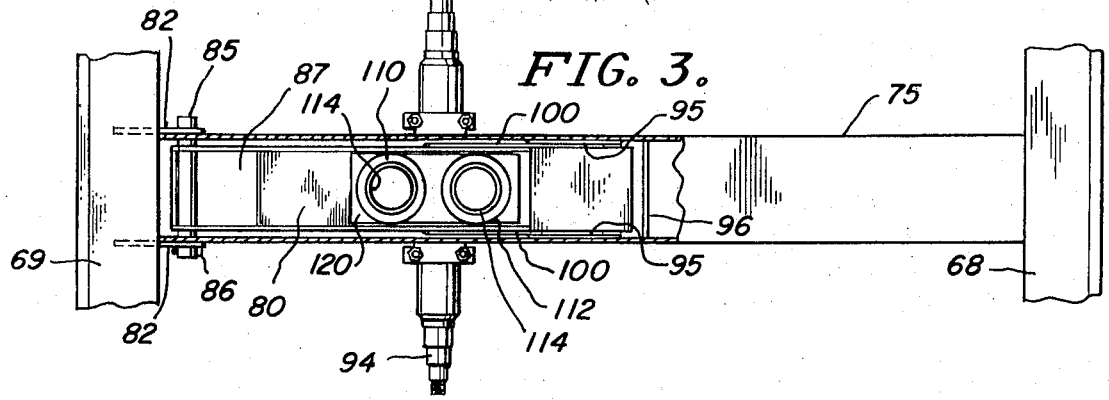
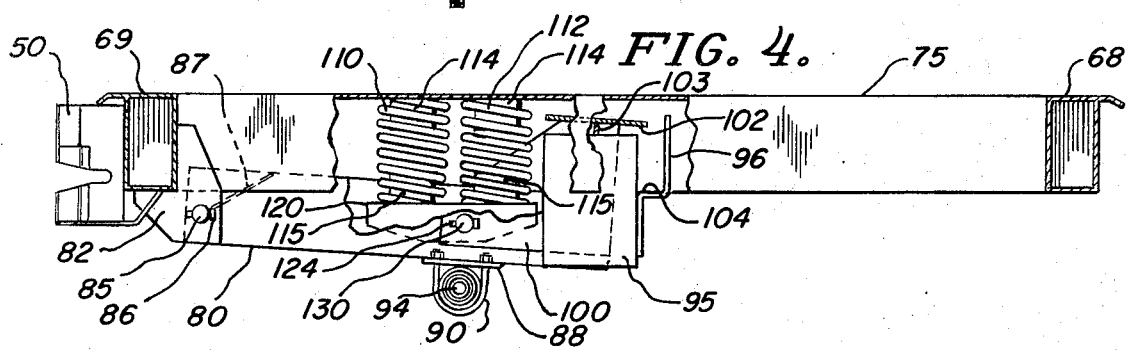

CENTER AXLE SUSPENSION SYSTEM FOR TRAILERS

My invention relates to a center axle suspension system for trailer type vehicles and more particularly to an improved center axle suspension for a two wheel type trailer to aid in the support of the same.

Trailer type vehicles for load carrying purposes have included a third or centrally located wheel for stabilization and load distribution purposes. These are generally fixed with respect to the side supporting wheels or require complex mounting structures for freedom of movement such that the costs of the structures are increased and the load carrying ability and handling are diminished.

The present invention is directed to a simplified center axle suspension for a third wheel or pair of wheels in a conventional two axle trailer type vehicle which improves the life of the tires or wheels for the third wheel and allows for uniform distribution of load on all wheels. The improved center axle suspension system is applied to a trailer type vehicle having a pair of aligned axles on the sides of the chassis with each having a pair of support wheels or tires mounted thereon for load carrying purposes. The center wheel or axle mounts a pair of tires centrally located on the chassis and intermediate the side wheels being spaced slightly ahead toward the hitch or forward end of the chassis from the aligned side wheel axles. This improved structure provides a more stable unit in terms of ridges encountered in fields and on road operations since the center axle is mounted on a pivoted lever allowing the same to move up or down and insuring that the chassis will not tip from side-to-side with the load thereon when ridges are encountered in the area of the center of the road or between the wheels. In ditches or depressions, the center wheels carry a portion of the load and upon encountering ridges or bumps, the suspension axle absorbs a high percentage of the shock load imparted to the chassis.

It is therefore the principal object of this invention to provide in a trailer type vehicle an improved center axle suspension system.

Another object of this invention is to provide in a center axle suspension system a pivoted lever member mounting the center wheels of a trailer type vehicle having a pair of aligned axles on the outer edge of the same to improve load carrying ability and stability.

A further object of this invention is to provide a center axle suspension system of this type which permits the center axle or wheels to absorb shocks and prevent tipping of the chassis and the load supported thereon on an uneven terrain.

A still further object of this invention is to provide a trailer type vehicle with an improved center axle suspension system which is relatively low in cost and easy to maintain and which minimizes wear on the center wheels.

These and other objects of this invention will become apparent from a reading of the attached description together with the drawings wherein:

FIG. 1 is a side elevation view of a trailer type vehicle with the improved center axle suspension incorporated therewith;

FIG. 2 is a plan view of the vehicle of FIG. 1 with parts broken away;

FIG. 3 is a plan view of a portion of the vehicle showing the improved center axle suspension with parts broken away; and FIG. 4 is a side elevation view of a portion of the suspension system shown in FIG. 3 with parts broken away.

My improved center axle suspension system for trailers is shown in FIGS. 1 and 2 in fragmentary side elevation and plan views of a trailer type bed, indicated generally at 10, connected to and carried by a chassis, indicated generally at 20. The chassis has wheel supports, indicated generally at 30, positioned on the sides of the chassis and as shown in the drawings are in the form of dual wheels. A suitable center wheel or dual wheel support is positioned beneath the chassis at the center thereof and indicated generally at 40. The front end of the chassis mounts a pivot hitch coupling 50 on either side of the chassis frame and this is connected to a draw bar 60 and a coupling member suitable for connecting the chassis to a towing vehicle and underlying a portion of the bed 10 positioned on the chassis. It will be understood that in addition to the bed, a suitable wall container or body may be included with the bed for containing materials to be transported. Since this may take many forms, these details are omitted for simplicity. The trailer type vehicle thus shown is of the two wheel type with a center wheel slightly forward of the aligned side wheels for stability purposes, as will be hereinafter noted. The chassis frame 20 is comprised of a plurality of elongated tubular frame members 65 extending the length of the chassis frame which are secured to front and rear transversely extending frame members 68, 69 through suitable means such as welding. The end frame members extend beyond the side frame members to either side to provide a bed extension sufficient to accommodate the width of the platform or bed while the length of the chassis, as indicated in FIGS. 1 and 2, is short of the entire length of the platform or bed mounted thereon. Coupled to the outside elongated frame members are suitable mounting flanges 70 which mount an axle 72 carrying the dual type wheel supports or tires 74 on either side of the coupling point in a solid connection. These wheels are inboard of the total width of the chassis because of the end frame members' overhang and the axles thereof are aligned horizontally and translationally on opposite sides of the chassis frame. The frame further includes a generally U shaped center frame suspension member 75 which extends between the end frame members 68, 69 and is suitably secured thereto by means such as welding.

The center frame member 75 carries the center axle suspension system which takes the form of a pivoted lever member 80 mounted on the undersurface of the center beam or frame member. As will be seen in FIGS. 3 and 4, suitable plate members 82 are welded to the front transversely extending end frame member 69 and these have an aperture therethrough through which a journaling pin 85 extends to be suitably secured therein by means of a cotter key 86 and a headed extremity 85 on the other end of the pin. The lever member 80 is a generally U-shaped member having a spacer plate 87 welded therein. A suitable mounting flange plate 88 is welded to the bottom of the U-shaped lever member 80 midway along its extent and these carry U-shaped shackle members 90 which mount the axle 94 carrying the dual center wheels 97, 98 to either side of the same. The U-shaped lever member 80 has a width less than the width of the generally U-shaped center frame member 75 so that the open upper edge fits therein and is adapted to pivot therein. The U-shaped frame member 75 has welded to the inner sides thereof near the end of the lever member 80 a pair of wear plates 95 which extend below the lower surface of the U-shaped center frame member. A generally Z shaped stop flange 96 is similarly positioned at its upper end within the U shaped center frame member 75 and suitably secured thereto by welding with the transversely extending portion thereof being located at the lower edge of the U-shaped frame and with the bottom of the stop member extending down and being connected to the wear plates 95 below the lower surface of the center frame member 75. The lever member 80 has a pair of wear plates 100 welded or suitably secured to the sides of the same and extending from an area above the shackle mounting plate 88 to the unpivoted end of the lever and above the edge of the same. These are positioned inside the wear plates 95 attached to the center frame member to guide the pivotal movement of the lever member therein. The wear plates 100 are positioned on either side of the lever member 80 and carry a stop plate 102 on the upper edges of the same with a suitable transversely extending spacer member 103 being positioned between the wear plates above the lever member for spacing purposes. The stop plate 102 extends beyond the ends of the wear plates 100, as will be best seen in FIGS. 3 and 4, and is adapted to engage the transversely extending or shoulder portion 104 of the Z-shaped stop member 96 to limit downward pivotal movement of the lever member.

The suspension system includes a pair of coil compression springs 110, 112 positioned between the lever member 80 and the center frame member 75, as will be hereinafter noted. The compression springs may be replaced by an air suspension bag. The inner or closed surface of the center frame member 75 has welded thereto a pair of cylindrical members 114 on which the ends of the coil springs 110, 112 are positioned. Positioned on the inside of the U-shaped lever member is a generally U-shaped spring support member 120, the latter carrying a pair of cylindrical members 115 suitably welded thereto and spaced apart the same distance the cylindrical members 114 are positioned and spaced on the inner surface of the frame member 75. The cylindrical members 114, 115 are aligned vertically when the lever member 80 is pivoted on the plates 82 through the pivot pin 85 and the opposite end of the springs 110, 112 are positioned over the cylindrical members 115. The U-shaped spring retaining member 120 is pivotally mounted on the sides of the U-shaped lever member which is open at its upper extremity by means of a pivot pin 130 which extends through apertures in the sides of the lever member 80, wear plates 100 and the U shaped spring guide member 120. This pin is suitably secured therein by means of a cotter key, such as is indicated at 124.

The improved center axle suspension provides a third set of wheels which cooperate with the side wheels of the trailer type vehicle to reduce the loading thereon. The center wheels being mounted on the pivoted lever member 80 are free to move up and down depending upon ground terrain a limited distance to allow for a more uniform load on all of the six wheels of the chassis supporting the platform load. The compression springs, which are held in position by short tubes welded to the frame and the spring support in the lever member, guide the movement of the springs and position the same between the lever member and the center frame member 75 of the chassis frame. Under normal conditions the spring suspension is approximately in the center of its up and down range such that it is free to move up and down a limited distance defined upwardly by the collapsed position of the springs and in the downward direction by the engagement of the stop member 102 with the stop plate 96 or the transversely extending portion 104 thereof. The center axle suspension makes for a more stable chassis or platform on ridges encountered in fields and in road operation, and because the center axle can move up the bed or wagon will not tip from one side to the other side as it would with a fixed center axle frame. In depressions, such as ditches or the like, the center wheels will carry a portion of the load. In the center axle suspension system the spacing of the axis of the axle 94 from the coincident axes of the axles 72 on the sides of the chassis 20 may vary from 4 – 20 inches forward or toward the front end of the chassis or the hitch end of the same. This spacing gives a smoother ride across ridges, such as a washboard road type, and upon encountering large bumps or obstructions, the suspension axle will first absorb a large percentage of the shock load imparted to the chassis frame.

Therefore in considering the present invention it should be remembered that the present disclosure is illustrative only and the scope of the invention should be determined by the appended claims.

What is claimed is:

1. A trailer type wagon comprising, an elongated bed, a chassis supporting the elongated bed and secured thereto beneath the same, a pair of axles mounted on the sides of the chassis in horizontal alignment, wheel means mounted on said axles, a pivot hitch positioned on one end of said chassis, a center axis suspension member mounted intermediate the sides of the chassis and to one side of the axis of horizontal alignment of the pair of axles toward the pivot hitch, said suspension means including a pivoted lever member mounted on the underside of the chassis for limited pivoted movement and having spring means positioned between said pivoted lever member and the chassis, said spring means being a pair of compression springs positioned between the pivoted lever member and the chassis and including cylindrical members secured respectively to the chassis and the lever member fitting inside the coil springs to position and guide the same, and an axle including wheels positioned thereon mounted on the pivoted lever member, said cylindrical members secured to the pivoted lever member being mounted on a support pivotally connected to the pivoted lever member to provide for movement of one end of the springs with movement of the pivoted lever member.

2. The trailer type wagon of claim 1 in which the pair of axles are rigidly connected under the sides of the chassis and each include a pair of wheels positioned respectively on each side of the connection to the chassis.

3. The trailer type wagon of claim 2 in which the chassis includes a flange structure connected thereto and cooperating with a second flange structure carried by said lever member to restrict pivotal movement of the lever member relative to the chassis.

4. The trailer type wagon of claim 1 in which the pivoted lever member is pivotally mounted at one end on the undersurface of the chassis structure adjacent said pivot hitch end with the free end of the pivoted lever member extending toward the aligned horizontal axis of the pair of axles and with the third axle intermediate the extent of the pivoted lever member.

5. The trailer type wagon of claim 4 in which the axis of the third axle is offset from the axis of the aligned pair of axles in the range of 4 to 20 inches toward the hitch end of the chassis member with the axles being mounted in fixed spaced parallel relationship for all movements of the pivoted lever member.

6. A trailer type structure comprising, a chassis, a pair of axles rigidly mounted to the frame adjacent the sides thereof and intermediate the length thereof, said axles being mounted in horizontal alignment and mounting at least a pair of wheel means thereon, hitch means positioned at one end of the chassis for coupling the same to a draft vehicle, a center wheel suspension means connected to the undersurface of the chassis intermediate the sides thereof and to one side of the pair of axles toward the hitch end of the same, said center wheel suspension means including lever means pivotally mounted on the chassis and carrying a third axle with wheel means thereon disposed cen-trally of the chassis, and means biasing said lever means into a fixed position relative to the chassis and permitting limited pivotal movement of the lever means toward and away from the chassis, said biasing means includes springs rigidly connected to the chassis at one extremity and pivotally connected to the lever means.

\* \* \* \* \*